3,562,323
ALKANESULFONYL CHLORIDE PROCESS
Shigeto Suzuki, San Francisco, Calif., assignor to Chevron Research Company, San Francisco, Calif., a corporation of Delaware
Filed Oct. 3, 1966, Ser. No. 583,676
Int. Cl. C07c *143/70, 149/06*
U.S. Cl. 260—543                                   15 Claims

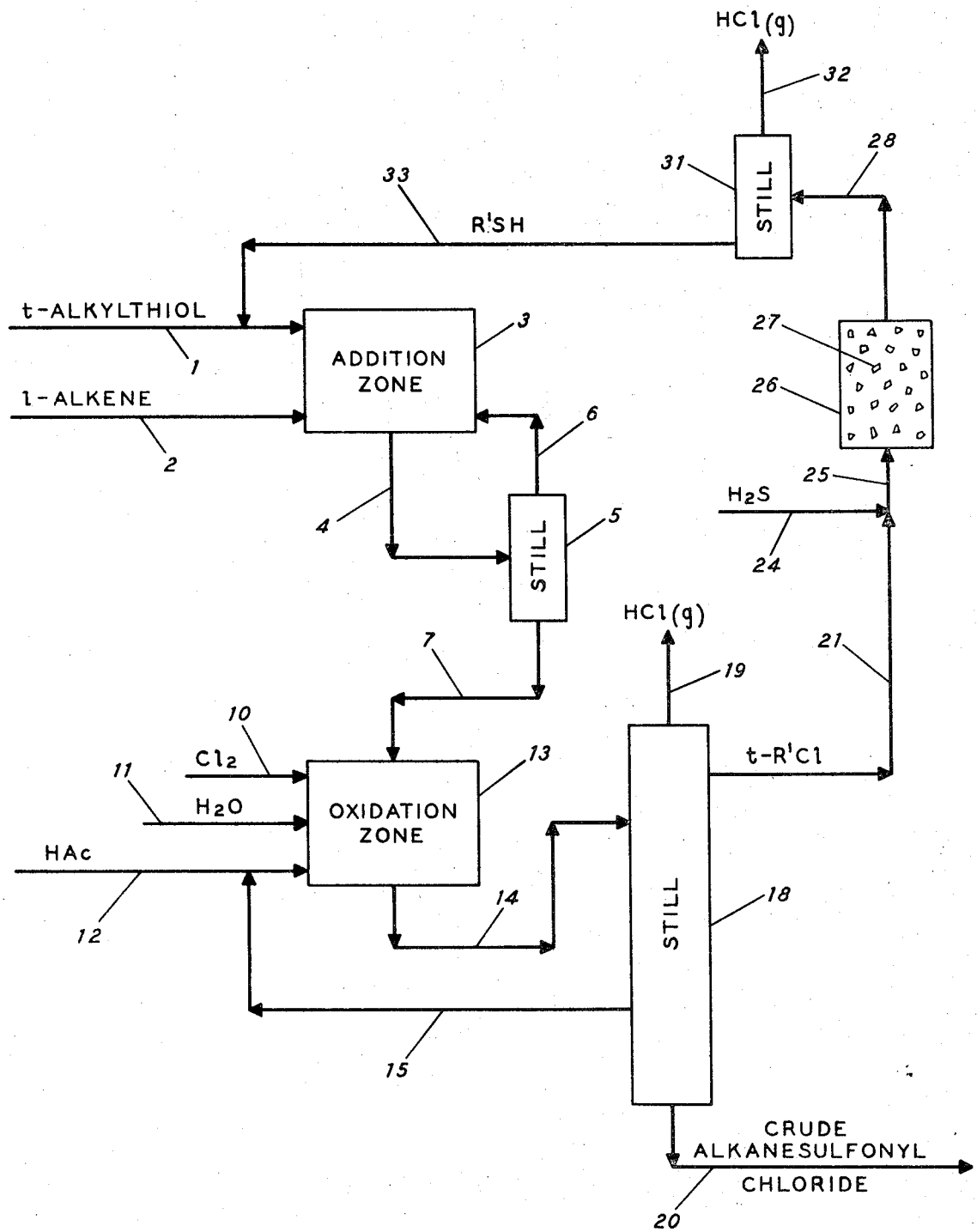

ABSTRACT OF THE DISCLOSURE

Alkanesulfonyl chlorides are produced in an integrated process in which: (a) a lower t-alkylthiol is reacted with an alkene containing non-quaternary carbon-carbon double bond unsaturation yielding a t-alkyl-alkyl sulfide; (b) the sulfide is oxidized with chlorine and water yielding the alkanesulfonyl chloride and a lower tertiary alkyl chloride; and (c) the t-alkylthiol is regenerated and recycled to the process by reacting the chloride with hydrogen sulfide in a vapor phase reaction catalyzed by phosphoric or sulfuric acid disposed upon an inert solid inorganic oxide.

---

This invention relates to an improved process for the production of alkanesulfonyl chlorides. More particularly, it relates to an improved process for the production of alkanesulfonyl chlorides from ethylenic hydrocarbons having at least one hydrogen atom bonded to one carbon atom of the double bond pair. Still more particularly, it relates to the production of n-alkanesulfonyl chlorides.

Organic sulfonyl chlorides are reactive compounds widely used in organic syntheses (cf. U.S. 3,248,423; U.S. 3,226,433; U.S. 3,214,464 and U.S. 2,623,069).

It is known to prepare alkanesulfonyl chlorides from alkanethiols, chlorine and water (see for example, U.S. 3,248,423). Alkanethiols in general are not economically available while alkenes as from wax cracking and the like are available. The addition of hydrogen sulfide to simple olefins, i.e., olefins having at least one hydrogen atom attached to one of the carbon-carbon double bond pair of the alkene, results in general in the production of a product mixture, viz:

(1)        $RCH=CH_2 + H_2S \rightarrow RCH_2CH_2SH$ (2)        $RCH_2CH_2SH + RCH=CH_2 \rightarrow R'SR'$ in which dialkyl sulfide is produced in substantial amounts. In the conventional conversion of these sulfur compounds to sulfonyl chlorides, the chlorosulfonylation reaction in the main proceeds as follows:

(3)    $RSR + 3Cl_2 + 2H_2O \rightarrow RSO_2Cl + RCl + 4HCl$ and thus only one-half of the alkene feed is potentially convertible to the desired alkanesulfonyl chloride. In addition to the foregoing, in reaction (3) above appreciable by-product formation can occur, yielding other chlorinated products than the desired sulfonyl chlorides. These are representable as $R(Cl)SO_2Cl$, $R(Cl)_2$ and higher chlorinated species. If R is a primary alkyl group, no RCl is produced, and the alkyl chloride portion of the products in Equation 3 above is essentially a mixture of $R(Cl)_2$ and $R(Cl)_3$ where $R(Cl)_3$ predominated.

It has now been found that alkanesulfonyl chlorides can readily and efficiently be prepared from certain ethylenic hydrocarbons in an integrated process in which (a) a lower t-alkylthiol is added to a non-quaternary alkene yielding the corresponding unsymmetrical t-alkyl-alkyl sulfide; (b) the unsymmetrical sulfide is oxidized in the liquid phase by the action of chlorine and water; (c) the resulting reaction product mixture is separated by distillation into four components: (1) an overhead hydrogen chloride fraction which is discarded, (2) a solvent fraction which is recycled to the process, (3) a crude alkanesulfonyl chloride fraction which is recovered, and (4) a t-alkyl chloride fraction; (d) the t-alkyl chloride is passed preferably in the vapor phase, together with added $H_2S$ into contact with a solid acidic catalyst whereby it is efficiently converted to a mixture of lower t-alkylthiol and HCl and (e) after fractionation, the separated t-alkylthiol is recycled to the process as regenerated feed.

Surprisingly, unsymmetrical t-alkyl-alkyl sulfides respond essentially specifically to oxidation by chlorine and water, viz:

(4)    t—R—S—R' + $3Cl_2 + 2H_2O \rightarrow$
$R'SO_2Cl + t$—$RCl + 4HCl$ making possible substantially quantitative conversions of simple alkenes to corresponding alkanesulfonyl chlorides. By the use of a novel catalytic displacement viz:

(5)    $t-R-Cl + H_2S \xrightarrow{\text{catalyst}} t-RSH + HCl$ the t-alkylthiol required for production of the t—R—S—R' used in reaction (4) above is regenerated. The net or overall reaction is:

(6)    $RCH=CH_2 + H_2S + 3Cl_2 + 2H_2O \rightarrow$
$RCH_2CH_2SO_2Cl + 5HCl$

By lower t-alkylthiol is meant those t-alkylthiols having from 4 to 8 carbon atoms, inclusive, and a single sulfhydryl group, i.e., RSH, where R is a t-alkyl radical.

The accompanying figure illustrates an embodiment of the instant process.

t-ALKYL-n-ALKYL SULFIDE PRODUCTION t-Butylthiol and dodecene-1 are introduced into addition zone 3 via lines 1, 2 and 33. In general trace peroxide impurity in the olefin and/or entrained oxygen is a sufficient source for the free radical catalysis of the addition; otherwise a trace of added organic peroxide, or irradiation by light, is sufficient. Mol ratios of thiol to alkene of 1.1 to 1 are satisfactory, as are average residence times in zone 3 of 0.5 to 1 hour at a temperature of about 30° C. Via line 4 the resulting crude t-butyl-n-dodecylsulfide product is delivered to still 5 wherein unconverted t-butylthiol and dodecene-1 are separated as an overhead fraction and recycled to vessel 3. Via line 7 the sulfide is delivered to the oxidation zone 13 which is a stirred reactor.

CHLORINE-WATER OXIDATION OF t-RSR'

Via line 12 acetic acid solvent is introduced into oxidation zone 13 at a rate sufficient to maintain a volume ratio of solvent to sulfide of about 2 to 1, respectively. Via lines 10 and 11 chlorine and water are introduced into reactor 13 in mol ratios based upon sulfide of about 3:2:1, respectively. An average residence time in zone 13 of about 0.5 hour is sufficient for essentially quantitative conversion at about 25° C. The reaction product mixture is withdrawn from zone 13 via line 14 and delivered to still 18 wherein it is separated into a bottoms crude dodecylsulfonyl chloride product fraction and two overhead fractions, HCl(g), which is vented via line 19 and t-butyl chloride, which is passed via lines 21 and 25 to vessel 26, together with added $H_2S$ (i.e., at a rate sufficient to maintain about a 3:1 mol ratio of $H_2S$ to chloride). The desired sulfonyl chloride is withdrawn from the process via line 20 for further purification, if desired.

t-BUTYLTHIOL REGENERATION

Vessel 26 is charged with a solid acidic fixed-bed catalyst, such as phosphoric acid on kieselguhr, and the reactor and charge are maintained at a temperature of about 150° C. A 3:1 mol ratio mixture of H₂S and t-butyl chloride, respectively, introduced via line 25 is passed through the fixed-bed catalyst in vessel 26 with the feed contact time being maintained at about 1.1 minutes. Via line 28 the resulting product containing t-butylthiol, hydrogen sulfide and hydrogen chloride is withdrawn from reactor 26 and passed to still 31 wherein it is separated into a bottoms thiol fraction which is recycled to the process via line 33 and an overhead hydrogen chloride-hydrogen sulfide fraction which is vented via line 32 for separation of hydrogen sulfide and recycle thereof to the process.

The yields of the desired alkanesulfonyl chlorides are in general in excess of 95%, and hence for many purposes no further processing of the product is required. This is of particular importance because most alkanesulfonyl chlorides are unstable at the elevated temperatures required for distillation.

The addition of t-butylthiol to an alkene is a reaction well known in the art [cf. Walling, "Free Radicals in Solution" (Library of Congress Catalogue Card: 57–10818), pp. 314–329].

In the liquid phase chlorine-water oxidation stage of the process, suitable reaction temperatures are in the range —10 to about 100° C. In general the use of chlorine in excess of the stoichiometric requirement is desirably avoided. Excess chlorine causes by-product contamination of the sulfonyl chloride.

Substantial excess additions, i.e., over the stoichiometric requirement, of water should be avoided at least in the case of high molecular weight sulfide feeds because of adverse solubility effects.

Although the chlorine-water oxidation can be effected neat, that is without dilution, the use of diluents is preferred. Alkanoic acids, such as acetic, propionic and the like, are preferred. Acetone, carbon tetrachloride, chloroform, pentane, benzene and other common solvents are in general useful so long as the medium, relative to the dialkyl sulfide being oxidized, is inert in the competition reaction with chlorine.

Representative examples of chlorine-water oxidations including conditions etc. are listed in Table I following. The sulfide feed compounds in general were obtained from the reaction of t-butylthiol with simple olefinic hydrocarbons.

TABLE I

| Ex. No. | t-Butyl-S—R "R" | Solvent (vol. ratio to sulfide) | Reaction temp., °C. | RSO₂Cl yield, percent |
|---|---|---|---|---|
| 1 | Octyl | AcOH (2) | 0–5 | 82+ |
| 2 | do | Acetone (1) | 15–20 | 94 |
| 3 | Dodecyl | Propionic acid (1.2) | 25 | 86 |
| 4 | Lauryl | Propionic acid (1.6) | 25 | 99 |
| 5 | Hexadecyl | Propionic acid (2) | 25 | >99 |
| 6 | Octadecyl | Propionic acid (3.5) | 25 | 96.3 |
| 7 | Eicosanyl | Propionic acid (3) | 25 | >99 |
| 8 | C₁₅₋₁₈ CWD ¹ | do | 25 | >99 |
| 9 | C₆H₁₃C(C₄H₉)CH₂- | Propionic acid (2) | 25 | 77 |
| 10 | C₆H₁₃(CH₃)CH— | AcOH (1.5) | 25 | >95 |
| 11 | Polymer ² | CCl₄ plus propionic acid. | 25 | >95 |

¹ Cracked wax olefin, i.e., α-olefin mixture.
² Ziegler polymer, mol weight ~250,000 units (one vinyl double per ~5000 mm.).

In the above examples t-butyl chloride is evolved in substantially quantitative yields and in a form suitable for direct introduction to the thiol regeneration stage of the instant process.

Examples 1–11, inclusive, demonstrate that t-butyl sulfides in general which are obtainable from the free radical catalyzed addition of t-butylthiol to a non-quaternary olefinic hydrocarbon are satisfactory feeds to the subject process.

The conversion of lower tertiary alkyl chlorides to t-alkylthiols is in general conveniently accomplished by introducing a mixture of hydrogen sulfide and t-alkyl chloride into reactive contact with inorganic oxide solids containing Bronsted (proton donating) acid sites. The reaction is summarized by the equation:

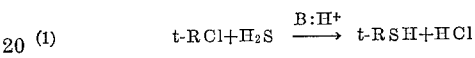

(1) $\quad t\text{-}RCl + H_2S \xrightarrow{B:H^+} t\text{-}RSH + HCl$ and takes place in both the liquid and vapor phases. At about 90° C. reaction times in the liquid phase are of the order of three hours. In the vapor phase at 75° C. substantial conversions are experienced even after only 0.3 minute contact time. At about 150° C. essentially quantitative conversions and yields are enjoyed after no more than about a 1-minute reaction period. In general above about 300° C. little or none of the desired thiol is produced.

Preferably the reaction is carried out in the vapor phase at elevated temperatures, i.e., in the range 125–225° C. under atmospheric pressure and at contact times of less than five minutes. Operation in this manner is usually more economical in terms of time and equipment costs.

Mineral acid washed inorganic oxides in general are useful catalysts for the present process. Phosphoric acid supported on kieselguhr is especially satisfactory. Other useful acidified solids include clays, silica, silica-alumina, and the like. Sulfuric acid supported by inorganic oxides as above is also useful. That is, any otherwise substantially inert inorganic solid having available an appreciable Bronsted acid activity is useful for catalysis of the displacement of Equation 1 above.

Mol ratios of H₂S to t-alkyl chloride should in general be in the range 1 to 5 to 1, respectively. Higher ratios can be used.

In Table II following are listed representative examples under a variety of reaction conditions in which t-butyl chloride was reacted with hydrogen sulfide. The catalyst used was a commercial phosphoric acid on kieselguhr (67% P₂O₅ on SiO₂, 16/20 mesh). It was packed in a 4 mm. diameter Pyrex tube which was heated by external means.

TABLE II

| Example No. | t-BuCl feed rate cc./min. | N₂ rate cc./min. | H₂S rate cc./min. | Contact time, min. | Reactor temp., °C. | Catalyst | Conversion, percent | Yield, mol percent i-C₄H₈ | Yield, mol percent t-BuSH |
|---|---|---|---|---|---|---|---|---|---|
| 12 | 20.5 | 0 | 0 | 0.033 | 320 | None | <5 | | |
| 13 | 20.5 | 0 | 0 | 0.029 | 425 | do | 75 | 95 | |
| 14 | 8.2 | 0 | 71.5 | 0.007 | 425 | do | 30 | 95 | |
| 15 | 4.1 | 13.2 | 0 | 0.19 | 111 | Yes | ¹ 82 | | |
| 16 | 4.1 | 0 | 13.2 | 0.14 | 106 | do | 63 | Trace | 95 |
| 17 | 4) ¹ | 0 | 13.2 | 0.30 | 106 | do | 79 | do | 95 |
| 18 | 4.1 | 0 | 13.2 | 0.30 | 123 | do | 76 | do | 95 |
| 19 | 4.1 | 0 | 13.2 | 0.29 | 149 | do | 40 | do | 95 |
| 20 | 4.1 | 0 | 13.2 | 0.31 | 74 | do | 75 | do | 95 |
| 21 | 4.1 | 0 | 13.2 | 0.55 | 111 | do | 70 | do | 95 |
| 22 | 4.1 | 0 | 13.2 | 0.55 | 149–166 | do | 88 | do | 95 |
| 23 | 4.1 | 0 | 13.2 | 1.10 | 149–166 | do | 98 | do | 95 |

¹ Polybutene deposited on catalyst surfaces.

Simple alkenes in general are converted to the corresponding alkanesulfonyl chlorides in the subject process. The free radical catalyzed addition of lower t-alkylthiols to these alkenes is a general reaction. Addition occurs readily to ethene which has but two carbon atoms and likewise to Ziegler polymer type alkene known to have a molecular weight as high as 250,000, i.e., containing more than 15,000 carbon atoms. Simple alkenes are preferred feeds, for example, 1-alkenes as obtained from thermal non-catalytic cracking of n-alkanes, mixtures thereof, and the like.

Alk-poly-enes are also useful and yield the corresponding alkane-poly-sulfonyl chlorides. For example, from 1,5-hexadiene this process yields $(CH_2)_6(SO_2Cl)_2$, and from 1,3,5-trivinylbenzene there is obtained the corresponding trifunctional compound.

$$C_6H_3(CH_2CH_2SO_2Cl)_3$$

Similarly, from cycloalkenes, such as vinylcyclohexene, a mixed primary and secondary disulfonyl chloride results.

Substituted olefins are useful process feeds for the subject process. Olefinic hydrocarbon derivatives containing functional groups such as the halogens, oxygen as in the ether linkage, and hydroxyl and the like in general are not interfered with in regard to the above described addition of t-alkylthiol to the carbon-carbon unsaturation or the subsequent chlorine-water oxidation of sulfide sulfur as in the present process. In the instant context, these are inert substituents.

Representative alkenes useful in the process in addition to those noted above and in the examples are propene, 1-pentene, cyclohexene, α-vinylnaphthalene, hexadecene-3, 2-methyl-1-pentene, 1,7-octadiene; 1,15-hexadecene, α-pinene, β-pinene and the like.

I claim:
1. Process for the production of an alkanesulfonyl chloride which comprises:
   (a) reacting a lower t-alkylthiol of the formula RSH wherein R is a t-alkyl hydrocarbon radical having a carbon atom content in the range from 4 to 8, inclusive, with a nonquaternary alkene hydrocarbon or an inertly substituted nonquaternary alkene hydrocarbon having a carbon atom content in the range from 2 to about 15,000 and containing from one to three carbon-carbon double bonds each having at least one hydrogen atom bonded to one carbon atom of the double-bond pair, said reaction being effected by free radical catalysis at a temperature in the range from about 0 to 150° C., thereby producing the corresponding t-alkyl-alkanesulfide;
   (b) passing said sulfide into an oxidation zone maintained at a temperature in the range from about −10 to 100° C. and introducing chlorine and water into said sulfide in an amount not in excess of substantially the stoichiometric requirement, thereby converting a substantial portion of said sulfide to a mixture of the corresponding alkanesulfonyl chloride and t-alkyl chloride;
   (c) separating said mixture by vaporizing said t-alkyl chloride, thereby recovering said sulfonyl chloride as a bottoms product;
   (d) introducing in the vapor state said separated t-alkyl chloride together with from about 1 to 5 mols of hydrogen sulfide per mol of the chloride into contact in a vapor phase reaction zone with a catalyst consisting essentially of phosphoric acid or sulfuric acid disposed upon an inert inorganic solid oxide containing Bronsted acid activity, said zone being maintained at a temperature in the range from about 50 to 300° C., thereby producing a mixture of regenerated lower t-alkylthiol, hydrogen sulfide and hydrogen chloride; and
   (e) separating said regenerated thiol from the mixture and passing it as a recycle stream to the process.
2. The process as in claim 1 further characterized in that said solid oxide is selected from the group consisting of clay, silica, silica-alumina and kieselguhr.
3. The process as in claim 1 further characterized in that said thiol is t-butylthiol.
4. The process as in claim 1 further characterized in that in accomplishing said chlorine-water-sulfide reaction an inert solvent is employed.
5. The process as in claim 1 further characterized in that the catalyst is phosphoric acid disposed upon kieselguhr.
6. The process as in claim 1 further characterized in that the reaction of the t-alkyl chloride with hydrogen sulfide is effected at a temperature in the range from about 125° C. to 225° C. with a contact time of less than about 5 minutes.
7. The process as in claim 1 further characterized in that said alkene is a 1-alkene.
8. The process as in claim 7 further characterized in that said alkene contains an inert substituent group.
9. The process as in claim 1 further characterized in that said alkene contains two carbon-carbon double bond functional groups and in that said groups are unconjugated groups.
10. Process for the production of a t-alkylthiol which comprises reacting a t-alkyl chloride of the formula RCl wherein R is a tertiary alkyl hydrocarbon radical having a carbon atom content in the range from 4 to 8, inclusive, with hydrogen sulfide by contacting in a vapor phase reaction zone a gaseous mixture of the reactants with a catalyst consisting essentially of phosphoric acid or sulfuric acid disposed upon an inert inorganic solid oxide containing Bronsted acid acitivity, said zone being maintained at a temperature in the range from about 50° C. to 300° C., and wherein for each mol of the chloride said mixture contains an amount of hydrogen sulfide in the range from about 1 to 5 mols.
11. The process as in claim 10 further characterized in that said contacting is for a period of less than 5 minutes at a temperature in the range from about 125° C. to 225° C.
12. The process as in claim 10 further characterized in that said catalyst is phosphoric acid disposed upon kieselguhr.
13. The process as in claim 10 further characterized in that the chloride is t-butyl chloride.
14. Process for the production of t-butylthiol which comprises reacting t-butyl chloride with hydrogen sulfide by contacting in a vapor phase reaction zone a gaseous mixture of the reactants with a catalyst consisting essentially of phosphoric acid disposed upon kieselguhr, said zone being maintained at a temperature in the range from about 125° C. to 225° C., and wherein for each mol of the chloride said mixture contains an amount of hydrogen sulfide in the range from about 1 to 5 mols.
15. The process as in claim 10 further characterized in that the catalyst is selected from the group consisting of phosphoric or sulfuric acid disposed upon a solid selected from the group consisting of clay, silica, silica-alumina and kieselguhr.

References Cited

UNITED STATES PATENTS

| | | | |
|---|---|---|---|
| 2,472,470 | 6/1949 | Eby | 260—609A |
| 2,831,031 | 4/1958 | Binning et al. | 260—609A |
| 3,376,348 | 4/1968 | Stratton | 260—609A |

OTHER REFERENCES

Lee, S. W., et al.: J. Org. Chem., vol. 5, pp. 81–85 (particularly pp. 83–84 relied upon) (1940).

LORRAINE H. WEINBERGER, Primary Examiner

E. J. GLEIMAN, Assistant Examiner

U.S. Cl. X.R.

260—609